(12) United States Patent
Nishikawa et al.

(10) Patent No.: US 12,514,824 B2
(45) Date of Patent: *Jan. 6, 2026

(54) DELAYED DISINTEGRATION-TYPE CAPSULE AND METHOD FOR PRODUCING SAME

(71) Applicant: MORISHITA JINTAN CO., LTD., Osaka (JP)

(72) Inventors: Takehiro Nishikawa, Hirakata (JP); Katsutoshi Ishii, Hirakata (JP); Kazuma Takahashi, Hirakata (JP)

(73) Assignee: MORISHITA JINTAN CO., LTD., Osaka (JP)

( * ) Notice: Subject to any disclaimer, the term of this patent is extended or adjusted under 35 U.S.C. 154(b) by 890 days.

This patent is subject to a terminal disclaimer.

(21) Appl. No.: 17/595,908

(22) PCT Filed: Jun. 12, 2020

(86) PCT No.: PCT/JP2020/023290
§ 371 (c)(1),
(2) Date: Nov. 29, 2021

(87) PCT Pub. No.: WO2020/251039
PCT Pub. Date: Dec. 17, 2020

(65) Prior Publication Data
US 2022/0226252 A1 Jul. 21, 2022

(30) Foreign Application Priority Data
Jun. 14, 2019 (JP) .................... 2019-111280

(51) Int. Cl.
*A61K 9/48* (2006.01)
*A61K 31/19* (2006.01)
*A61K 31/192* (2006.01)
*A61K 31/375* (2006.01)
*A61K 35/744* (2015.01)

(52) U.S. Cl.
CPC .......... *A61K 9/4858* (2013.01); *A61K 9/4816* (2013.01); *A61K 9/4825* (2013.01); *A61K 9/4833* (2013.01); *A61K 31/19* (2013.01); *A61K 31/192* (2013.01); *A61K 31/375* (2013.01); *A61K 35/744* (2013.01)

(58) Field of Classification Search
CPC .. A61K 9/4858; A61K 9/4816; A61K 9/4825; A61K 9/4833; A61K 31/19; A61K 31/375; A61K 35/744; A61K 9/5057; A61K 9/5073; A61K 9/4866; A61K 31/192; A61K 36/00; A61K 45/00; A61K 9/5005; A61K 9/5015; A61K 9/5036; A61K 9/5089; A61K 47/24; A61K 47/44
See application file for complete search history.

(56) References Cited

U.S. PATENT DOCUMENTS

| | | |
|---|---|---|
| 6,531,150 B1 | 3/2003 | Sunohara et al. |
| 9,278,070 B2 | 3/2016 | Coulter et al. |
| 2011/0230483 A1 | 9/2011 | Baettig et al. |
| 2013/0259933 A1 | 10/2013 | Kamaguchi et al. |
| 2015/0004226 A1 | 1/2015 | Baes et al. |
| 2020/0236984 A1 | 7/2020 | Nagae et al. |

FOREIGN PATENT DOCUMENTS

| | | |
|---|---|---|
| EP | 1310229 B1 | 12/2009 |
| JP | H7-53356 | 2/1995 |
| JP | H7-173052 | 7/1995 |
| JP | 5102401 B1 | 12/2012 |
| JP | 2014-139200 | 7/2014 |
| JP | 2015-199698 | 11/2015 |
| JP | 2016-74615 | 5/2016 |
| JP | 2017-214335 | 12/2017 |
| WO | 99/22719 | 5/1999 |
| WO | 2001/24780 A1 | 3/2001 |
| WO | 2018/154531 | 8/2018 |
| WO | 2019/111711 | 6/2019 |

OTHER PUBLICATIONS

International Preliminary Report on Patentability of PCT/JP2020/023290, Dec. 23, 2021, 6 pages.
"Standard for Fish Oils, Codex STAN 329-2017," Japan Aquatic Oil Association, 2018, pp. 1-6; with non-official translation (Codex Alimentarius Commission, "Fish oil standards of Codex").
International Search Report of PCT/JP2020/023290, Aug. 18, 2020, 3 pages.
The extended European search report issued for European Patent Application No. 20823501.0, Jan. 3, 2023, 8 pages.
Rademacher J, Welte T. Bronchiectasis—diagnosis and treatment. Dtsch Arztebl Int. Dec. 2011; 108(48): 809-15. doi:10.3238/arztebl.2011.0809. Epub Dec 2, 2011. PMID:22211147; PMCID:PMC3244167.
Office Action issued in Brazilian Patent Application No. BR112021024950-8, Aug. 13, 2024, with English translation (5 pages).
Office Action issued in Colombian patent application No. NC2021/0016625, Jun. 19, 2025, with English translation (23 pages).

*Primary Examiner* — Jessica Worsham
(74) *Attorney, Agent, or Firm* — HSML P.C.

(57) ABSTRACT

An object of the present invention is to provide a technique for delaying disintegration of a capsule by blending a certain component in a core of the capsule, and to increase the degree of freedom in capsule design. The present invention relates to a delayed disintegration-type seamless capsule that is a seamless capsule including a core, one or more intermediate layers formed on the core, and an outermost layer formed on the intermediate layers, wherein the core contains an active substance, an amphoteric surfactant, and a fat having a melting point of 40° C. or more, at least one layer of the intermediate layers contains a fat having a melting point of 45° C. or more, and the outermost layer contains a water-soluble natural polymer. The present invention also relates to a method for producing the same.

4 Claims, 2 Drawing Sheets

DELAYED DISINTEGRATION-TYPE CAPSULE AND METHOD FOR PRODUCING SAME

TECHNICAL FIELD

The present disclosure relates to a seamless capsule and a method for producing the same, and more particularly relates to a delayed disintegration-type seamless capsule capable of delaying disintegration of the capsule and a method for producing a delayed disintegration-type seamless capsule.

BACKGROUND ART

Seamless capsules are used in many applications from the viewpoint of ease of particle size control, simplicity of production, and the like. In particular, capsules enclosing useful bacteria such as bifidobacterium, capsules enclosing flavors such as menthol, and the like are commercially available. In those seamless capsules, it has been considered to control the release time of the contents (also referred to as a "core" or a "core agent").

JP 5102401 B1 (Patent Literature 1) proposes a seamless capsule that specifically disintegrates in a large intestine. In addition, JP 2014-139200 A (Patent Literature 2) proposes a capsule that can enable an active ingredient to reach a large intestine without being lost in a stomach or a small intestine. There are many techniques for delaying disintegration, but all of these proposals are improvements of so-called films such as an outermost layer and an intermediate layer of capsules, and result in reduced degrees of freedom in film design.

CITATIONS LIST

Patent Literature

Patent Literature 1: JP 5102401 B1
Patent Literature 2: JP 2014-139200 A

SUMMARY OF INVENTION

Technical Problems

An object of the present disclosure is to provide a technique for delaying disintegration of a capsule by blending a certain component in a core of the capsule, and to increase the degree of freedom in capsule design.

Solution to Problems

As a result of intensive studies to solve the above object, the inventors have found that the above object can be achieved by blending an amphoteric surfactant in a core of a capsule.

The present disclosure provides the following aspects.

[1] A delayed disintegration-type seamless capsule, comprising a core, one or more intermediate layers formed on the core, and an outermost layer formed on the intermediate layers,
wherein the core contains an active substance, an amphoteric surfactant, and a fat having a melting point of 40° C. or more,
at least one layer of the intermediate layers contains a fat having a melting point of 45° C. or more, and the outermost layer contains a water-soluble natural polymer.

[2] The seamless capsule according to [1], wherein the amphoteric surfactant is present in an amount of 3 to 50% by weight based on a total weight of the core.

[3] The seamless capsule according to [1] or [2], wherein the amphoteric surfactant is a phospholipid.

[4] The seamless capsule according to [3], wherein the phospholipid is lecithin.

[5] The seamless capsule according to any one of [1] to [4], wherein the active substance is selected from the group consisting of a Chinese herbal medicine extract, a tincture, a plant extract, an animal extract, a microbial extract, a microbially produced extract, a fruit juice, a functional polysaccharide, a polyphenol, vitamin C, vitamin B, an amino acid, a microorganism, a bacterium, an essential oil, an anti-inflammatory drug, a steroid drug, an omega-3-fatty acid, an omega-6-fatty acid, an omega-9-fatty acid, and combinations thereof.

[6] The seamless capsule according to any one of [1] to [5], wherein the water-soluble natural polymer is selected from among gelatin, agar, gellan gum, carrageenan, furcellaran, pectin, chitosan, alginic acid, curdlan, starch, modified starch, pullulan, mannan, and mixtures thereof.

[7] A method for producing a delayed disintegration-type seamless capsule, the method including: discharging a core liquid from an innermost nozzle of a concentric triple nozzle into a cooling liquid composed of a cooled liquid oil; and simultaneously dropping an intermediate layer liquid from an intermediate nozzle disposed outside the innermost nozzle and an outermost layer liquid from an outermost nozzle to form a seamless capsule, wherein
the core liquid contains an active substance, an amphoteric surfactant, and a fat having a melting point of 40° C. or more,
the intermediate layer liquid contains a fat having a melting point of 45° C. or more, and
the outermost layer liquid contains a water-soluble natural polymer.

[8] The method for producing a seamless capsule according to [7], wherein the amphoteric surfactant is present in an amount of 3 to 50% by weight based on a total weight of the core.

[9] The method for producing a seamless capsule according to [7] or [8], wherein the amphoteric surfactant is a phospholipid.

[10] The method for producing a seamless capsule according to [9], wherein the phospholipid is lecithin.

[11] The method for producing a seamless capsule according to [7] to [10], wherein the active substance is selected from the group consisting of a Chinese herbal medicine extract, a tincture, a plant extract, an animal extract, a microbial extract, a microbially produced extract, a fruit juice, a functional polysaccharide, a polyphenol, vitamin C, vitamin B, an amino acid, a microorganism, a bacterium, an essential oil, an anti-inflammatory drug, a steroid drug, an omega-3-fatty acid, an omega-6-fatty acid, an omega-9-fatty acid, and combinations thereof.

[12] The method for producing a seamless capsule according to [7] to [11], wherein the water-soluble natural polymer is selected from among gelatin, agar, gellan gum, carrageenan, furcellaran, pectin, chitosan, alginic acid, curdlan, starch, modified starch, pullulan, mannan, and mixtures thereof.

Advantageous Effects of Invention

In the present disclosure, capsule disintegration can be delayed merely by blending an amphoteric surfactant as a compounding ingredient forming a core. As a result, the degree of freedom in capsule design can be increased by combining with the disintegration delay due to the formulation of the film and the intermediate layer that have been developed so far. In addition, in the present blending of the amphoteric surfactant, the disintegration time of a capsule can be controlled by controlling the blending amount, selecting the film, etc., and in addition to an intestine-soluble capsule that does not disintegrate in the stomach and a large intestine disintegrable capsule that does not disintegrate in the stomach and the small intestine, a factor of the time for disintegration after a lapse of a certain time from ingestion can be added, so that the design of a seamless capsule becomes very easy. In particular, the pH is not constant from the lower part of the small intestine to the large intestine, and a composition that withstands acidity or alkalinity of the film is difficult to control the release (disintegration of a capsule) at that part, but the time control of the present disclosure enables disintegration at a part where the pH is not constant or disintegration at a part whose pH exceeds that pH.

DESCRIPTION OF EMBODIMENTS

Figure 1:
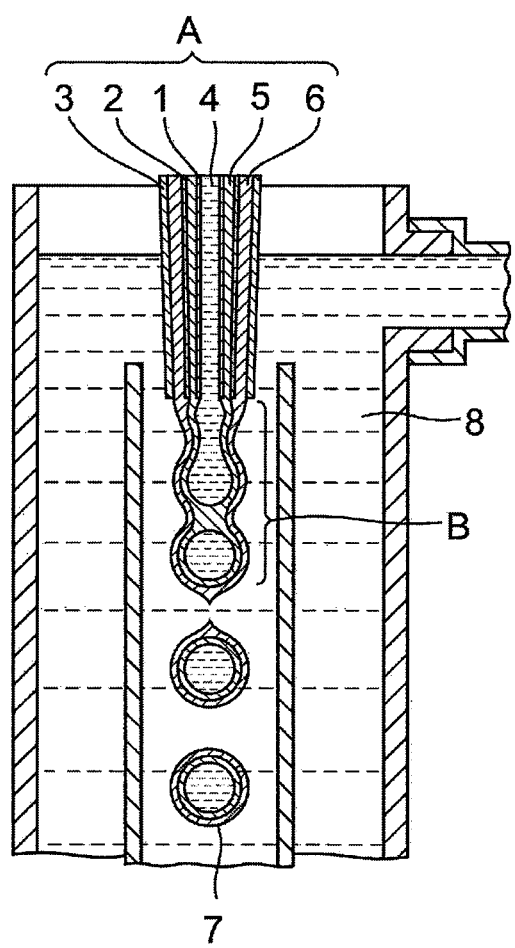
FIG. 1 is a schematic cross-sectional view of a nozzle portion of a production apparatus for producing a three-layered seamless capsule by a dropping method using a triple nozzle.

The present disclosure provides a seamless capsule including a core, one or more intermediate layers formed on the core, and an outermost layer formed on the intermediate layers, and is characterized in that the core contains an active substance, an amphoteric surfactant, and a fat having a melting point of 40° C. or more, at least one layer of the intermediate layers contains a fat having a melting point of 45° C. or more, and the outermost layer contains a water-soluble natural polymer.

Each configuration will be described below. Hereinafter, two types of fats having a melting point of 40° C. or more and a melting point of 45° C. or more, respectively, are described with respect to fats, but since both of them are fats, they are explained with the fat having a melting point of 45° C. or more included in the description of the fat having a melting point of 40° C. or more.

Core

For the core of the seamless capsule of the present disclosure, an active substance, an amphoteric surfactant, and a fat having a melting point of 40° C. or more are used. In the present disclosure, capsule disintegration can be delayed by blending the amphoteric surfactant in the core.

The active substance to be blended in the core of the seamless capsule is a drug or a functional component for a living body, and is selected from, for example, one or more of the groups consisting of a Chinese herbal medicine extract, tincture, a plant extract, an animal extract, a microbial extract, a microbially produced extract, fruit juice, functional polysaccharides, polyphenols, vitamin C, vitamin B, amino acids, microorganisms, bacteria (e.g., beneficial enterobacteria, essential oils (e.g., oils derived from citrus fruits and oils derived from roses), anti-inflammatory drugs (e.g., loxoprofen sodium and acetylsalicylic acid), steroid drugs (e.g., hydrocortisone and prednisolone), omega-3-fatty acid, omega-6-fatty acid, omega-9-fatty acid, and combinations thereof.

In the seamless capsule of the present disclosure, the amount of the active substance in the core is usually 1 to 50% by mass, preferably 5 to 30% by mass, and more preferably 10 to 20% by mass. When the content is more than 50% by mass, encapsulation becomes difficult, and when the content is less than 1% by mass, the effect of the active substance is not exhibited.

The core of the seamless capsule of the present disclosure further contains an amphoteric surfactant. Any amphoteric surfactant contains both a cationic structure and an anionic structure in its molecule, which exhibits amphoteric surface activity. Examples of the amphoteric surfactant include an amide-betaine type and an imidazoline type, and amphoteric surfactants derived from natural products are useful when used for organisms, especially humans, and in that case, a phospholipid, specifically lecithin is suitably used. The amount of the amphoteric surfactant used is not much different from the amount of the active substance used, and is usually 3 to 50% by mass, preferably 5 to 30% by mass, and more preferably 10 to 20% by mass. When the content is more than 50% by mass, encapsulation becomes difficult, and when the content is less than 3% by mass, the effect caused by using an amphoteric surfactant is not exhibited. The release time of the active substance in the body can be controlled independently of pH by adding the amphoteric surfactant. It is considered that the use of the amphoteric surfactant exhibits an effect because the retention of a solid form is enhanced or the melting point is increased. In any case, disintegration of the seamless capsule tends to be independent of a change in pH in the body.

In the core of the present disclosure, an additive such as an excipient, a stabilizer, a surfactant other than amphoteric surfactants, an auxiliary agent, or a foaming agent may be further appropriately blended. The amount of such additives is not particularly limited, but it should not be an amount with which the function of the seamless capsule of the present disclosure is inhibited.

The core of the seamless capsule of the present disclosure contains a fat having a melting point of 40° C. or more in addition to the components described above. In practice, the components described above are dissolved or suspended in the fat having a melting point of 40° C. or more. The reason for mixing with the fat in such a manner is that the contents are not affected by a large amount of water or the like present at the time of capsule production. In the present disclosure, as the fat having a melting point of 40° C. or more, edible vegetable fats, edible refined processed fats, sucrose fatty acid esters, glycerin fatty acid esters, and mixtures thereof are used. Among the fats having a melting point of 40° C. or more, a fat having a melting point of 45° C. or more may be used for at least one of the intermediate layers described later.

According to Japanese Agricultural Standards of edible refined and processed oil (Dec. 24, 2013, Ministry of Agriculture, Forestry and Fisheries, Notification No. 3115), the fat having a melting point of 40° C. or more is a fat whose melting point is adjusted to a melting point suitable for food application, by technique, such as applying to animal fat and oil, plant fat and oil and a mixture thereof by "hydrogenating (adding hydrogen to saturate unsaturated fatty acid to adjust its melting point)", "fractionating (conducting fractionating operation by centrifuging, filtering or adding dropwise to portions having different melting points, hardness and content of solid fat and oil)" or "ester-exchanging (changing composition of fatty acid by using catalyst to control melting point)." The fat to be used for the core of the present disclosure may be a fat that is not specially hydrogenated (in the present description, referred to as "non-hydrogenated fat"). The non-hydrogenated fat means that it is not a fat prepared by hydrogenating a natural fat to adjust its melting point as described above, and it may be one prepared by fractionating or trans-esterifying a raw material fat to adjust its melting point. The "melting point" mentioned in the present disclosure refers to an elevated melting point (a temperature at which a fat starts to soften and rise when the fat is heated in a capillary tube).

The non-hydrogenated fat is a fat not subjected to hydrogen addition treatment (so-called hydrogenation treatment), and a palm oil-based fat is suitable. The main fatty acids of palm oil are palmitic acid and oleic acid, and the composition ratio of these two fatty acids is 80% or more, and palm oil is semisolid at room temperature. When the palm oil is fractionated at a specific temperature, the palm oil can be divided into a low melting point liquid oil and a high melting point solid oil. The low melting point liquid oil contains a large amount of oleic acid, and the high melting point solid oil contains a large amount of palmitic acid. The liquid oil is conventionally called palm olein, and the solid oil is conventionally called palm stearin (this contains palmitic acid most in its composition, but it is not called palm palmitin). A desired non-hydrogenated fat with an adjusted melting point can be obtained also by trans-esterifying palm oil. As the non-hydrogenated fat for use in the present disclosure, fractionated oils of palm oil and trans-esterified fats of palm oil or the fractionated palm oil may be used singly, or may be used as a mixture thereof.

Specific examples of the non-hydrogenated fat for use in the present disclosure include palm stearin, palm olein, palm superolein, palm double olein, and palm mid-fraction, each obtained by fractionating palm oil, and trans-esterified fat of palm oil or the palm fractionated oils, and mixtures thereof. Naturally, the non-hydrogenated fat for use in the present disclosure is not limited thereto.

The fat having a melting point of 40° C. or more for use in the present disclosure may contain a sucrose fatty acid ester or a glycerin fatty acid ester. Sucrose fatty acid esters are compounds yielded by reacting a fatty acid (e.g., stearic acid or oleic acid) or the like with a hydroxyl group of sucrose, and are usually used as an emulsifier. Glycerin fatty acid esters are compounds in which a fatty acid is ester-bonded to one or two of three hydroxyl groups of glycerin, and are also used as an emulsifier. Compounds in which a fatty acid is bonded to all three hydroxyl groups are tallow or fat and are distinguished from glycerin fatty acid esters. As the fat having a melting point of 40° C. or more for use in the present disclosure, an edible vegetable fat, an edible refined fat, a sucrose fatty acid ester or a glycerin fatty acid ester may be used singly or as a mixture thereof.

Intermediate Layer

In the seamless capsule of the present disclosure, one or more intermediate layers are formed outside the core. That is, there may be either a single intermediate layer or a plurality of intermediate layers. In the case of a plurality of layers, the layers may be used in the same composition or in different compositions. Hereinafter, for simplicity, a case where there is a single intermediate layer will be described. It is desirable that the intermediate layer has a melting point 2 to 9° C., preferably 2 to 8° C. higher than the melting point of the core so that solidification can be controlled during cooling. When the melting point is less than 2° C., the content and the protective layer are likely to be mixed at the time of cooling, and conversely, when the melting point is higher than 9° C., the solidification of the intermediate layer does not occur, which hinders the formation of the seamless capsule.

For the intermediate layer is used a fat having a melting point of 45° C. or more. As the fat having a melting point of 45° C. or more, a fat having a melting point of 45° C. or more is selected from among the fats having a melting point of 40° C. or more described above. Specific examples of the fat having a melting point of 45° C. or more include the above-mentioned vegetable (fractionated) fat, beeswax, highly hardened oil, margarine, and shortening.

In the intermediate layer, lecithin or silicon dioxide may be blended in order to adjust interfacial tension, viscosity, or specific gravity. The amount of such additives is not particularly limited, but it should not be an amount with which the function of the seamless capsule of the present disclosure is inhibited.

Outermost Layer

In the seamless capsule of the present disclosure, the outer side of the intermediate layer is further covered with an outermost layer. The outermost layer contains a water-soluble natural polymer. The water-soluble natural polymer is selected from, for example, gelatin, casein, zein, pectin or derivatives thereof, alginic acid or salts thereof, agar, gellan gum, carrageenan, furcellaran, chitosan, curdlan, starch, modified starch, pullulan, mannan and mixtures thereof. Naturally, the water-soluble natural polymer is not limited thereto. These water-soluble natural polymers are present preferably in a range of 50% by weight to 90% by weight based on the total solid weight of the outermost layer composition of the seamless capsule. When an alginate salt, gellan gum, pectin, or carrageenan is used, an alkali metal salt, an alkaline earth metal salt, an ammonium salt, or the like may be optionally added.

The outermost layer of the seamless capsule of the present disclosure may further contain a plasticizer in order to obtain flexibility in a dry state, and examples of the plasticizer include glycerin and sorbitol. The blending amount of the plasticizer is 1 to 50% by mass, preferably 5 to 40% by mass, and more preferably 15 to 30% by mass based on the total weight of the film after drying. When the blending amount of the plasticizer is less than 1% by mass, the film cannot withstand vacuum drying, or cannot maintain sufficient flexibility in a dry state, so that cracks occur. When the blending amount of the plasticizer is more than 50% by mass, the film is softened, so that adhesion or melting occurs at a high temperature.

If necessary, the outermost layer of the seamless capsule of the present disclosure may contain, in addition to the above composition, various additives commonly used in this field, such as flavors, sweeteners, coloring agents, and preservatives such as paraben. When such additives are used, the total content of all the additives is, for example, 0.01% by weight to 10% by weight, and preferably 0.1% by weight to 5% by weight, based on the total solid weight in the composition to be the outermost layer of the capsule.

It is desirable that the outermost layer of the seamless capsule of the present disclosure after drying has a thickness of 10 to 600 µm, preferably 30 to 400 µm, and more preferably 40 to 250 µm. When the thickness of the outermost layer is less than 10 µm, the film strength tends to be low, and when the thickness exceeds 600 µm, the content amount decreases, so that the disintegrability tends to be poor.

The size of the seamless capsule of the present disclosure is not particularly limited, and it is desirable that the seamless capsule has a diameter of 0.3 to 10 mm, and preferably 1 to 8 mm. When the diameter of the capsule is less than 0.3 mm, the thickness of the intermediate layer of the layer structure of the seamless capsule is small, and the effect of preventing entry of moisture tends to be reduced, and when the diameter exceeds 8 mm, the capsule tends to be difficult to swallow.

Method for Producing Seamless Capsule

The seamless capsule of the present disclosure can be produced by a dropping method using a multiple nozzle having three or more layers, specifically, a method of dropping into a cooling liquid using a triple nozzle (for example, JP-A-49-59789, JP-A-51-8176, and JP-A-60-172343).

When a dropping method using a triple nozzle is used in the production of the capsule of the present disclosure, it is preferable that a core liquid is discharged through the innermost nozzle, an outermost layer liquid is discharged through the outermost nozzle, and a fat is discharged as an intermediate layer liquid through the intermediate nozzle. At the time of discharge, a composite jet is formed by simultaneously extruding those liquids at a constant speed into a cooling liquid flowing down at a constant speed, and the composite jet is discharged into the cooling liquid, whereby a three-layered seamless capsule can be continuously produced by surface tension acting between the cooling liquid and the film composition. In the case of a triple nozzle, the resulting capsule has a three-layered structure, and it contains a core in its innermost side. In the present disclosure, by adding the amphoteric surfactant into the core during the production described above, it is possible to delay disintegration and also possible to control the disintegration time.

FIG. 1 shows a schematic cross-sectional view of a nozzle portion of a production apparatus suitable for producing a three-layered seamless capsule by a dropping method using a triple nozzle.

FIG. 1 illustrates a state in which a seamless capsule jet B discharged from a triple nozzle A is cut in a cooling liquid 8 to form each seamless capsule 7. In the triple nozzle A, an inner nozzle 1, an intermediate nozzle 2, and an outer nozzle 3 exist concentrically, a liquid 4 to form a core of a capsule is discharged through the inner nozzle 1, a liquid to form an intermediate layer is discharged through the intermediate nozzle 2 (specifically, between the intermediate nozzle 2 and the inner nozzle 1), a liquid to form an outermost layer is discharged from the outer nozzle 3 (specifically, between the outer nozzle 3 and the intermediate nozzle 2), and three liquids are simultaneously discharged to form a seamless capsule jet B.

The seamless capsule 7 obtained as described above is subjected to forced-air drying at 5° C. to 30° C. for 2 to 12 hours. When it is necessary to lower the moisture content in the capsule 7, vacuum drying or vacuum freeze drying may be further performed after the forced-air drying. In the vacuum drying, the degree of vacuum is maintained at 0.002 to 0.5 MPa or less, and in the vacuum freeze drying is a method in which freezing and drying are performed at −20° C. or less. The time required for vacuum drying or vacuum freeze drying is not particularly limited. It is generally 5 to 60 hours, and preferably 24 to 48 hours. If it is less than 5 hours, the drying is insufficient, so that the water present in the capsule 7 may adversely affect the contents.

In the seamless capsule obtained by the method described above, an amphoteric surfactant (especially, lecithin) is contained in the core as described above, whereby the disintegration of the seamless capsule can be delayed and the disintegration time can also be controlled. In addition, not only the amphoteric surfactant of the present disclosure is added to the core, but also acid resistance, intestine solubility or large intestine disintegrability may be imparted to the film layer (especially, the outermost layer). By combining them, it is possible to control the disintegrability of the seamless capsule. In the seamless capsule of the present disclosure, for example, if time control is performed such that the seamless capsule is specifically disintegrated from the lower part of the small intestine to the large intestine, a certain type of drug or functional food can be delivered to a specific site, and the effect of the drug can be further enhanced.

EXAMPLES

The present disclosure will be described in more detail by way of examples. In the present disclosure, these examples are merely examples of the present invention.

Example 1

(a) Liquid for core: 47.17 Parts by weight of an edible fat (JC Oil manufactured by Taiyo Yushi Corp.; melting point: 52±3° C.), 11.79 parts by weight of an edible fat (K9190 manufactured by Taiyo Yushi Corp.; melting point: 49±3° C.), and 3.35 parts by weight of soybean lecithin were uniformly dissolved by stirring at 60° C., and into the resulting solution was mixed 4.69 parts by weight of Blue No. 1. The resulting suspension was used as a liquid for a core.

(b) Liquid for intermediate layer: 9.30 Parts by weight of an edible fat (JC Oil manufactured by Taiyo Yushi Corp.; melting point: 52±3° C.) and 0.7 parts by weight of soybean lecithin were mixed, affording a liquid for an intermediate layer.

(c) Liquid for outermost layer: 17.48 Parts by weight of gelatin [jelly strength: 280 bloom], 4.60 parts by weight of glycerin, 0.92 parts by weight of low methoxy (LM) pectin, and 85.20 parts by weight of purified water were uniformly mixed at 60° C., affording a liquid for an outermost layer.

Into rapeseed oil, cooled to 12° C. and flowing, were simultaneously dropped the liquid for a core through an innermost nozzle of a concentric triple nozzle, the liquid for an intermediate layer through an intermediate nozzle disposed outside the innermost nozzle, and the liquid for an outermost layer through an outermost nozzle, whereby a three-layered seamless capsule having a diameter of 6.0 mm was prepared. The resulting three-layered seamless capsule was forced-air dried at 20° C. for 8 hours. Using the resulting seamless capsule, a dissolution test was performed in the following manner.

Dissolution Experiment

An acidic solution and a neutralization solution were prepared as follows.

Acidic solution: a solution (pH 1.2) prepared by dissolving 2.0 g of sodium chloride in 7.0 mL of 12 N hydrochloric acid and water to adjust the volume to 1000 mL.

Neutralization solution: 0.20 mol/L aqueous solution of trisodium phosphate. Six seamless capsules produced above were immersed in 750 mL of the acidic solution for 2 hours using a paddle method (Toyama Sangyo NTR-6400A, rotation speed: 50 rpm), the dye dissolution rate in the acidic solution was measured under the condition of 630 nm, and the dissolution rate was calculated. The measurement was performed by sampling every hour. Then, the neutralization solution was added to the acidic solution to adjust the pH to 6.8, and the dye dissolution rate was measured in the same manner by sampling every 2 hours until a total of 26 hours. All measurements were performed at 37.5° C. The relationship between the dye dissolution rate (%) and the elapsed time (h) was graphically shown in FIG. 2.

Example 2 and Comparative Examples 1 to 2

Using the formulations shown in Table 1 below, seamless capsules were formed in the same manner as in Example 1, and dissolution experiments were performed in the same manner. The results are shown in FIG. 2 as in Example 1.

TABLE 1

| Discharge liquid | Raw material name | Example 1 | Example 2 | Comparative Example 1 | Comparative Example 2 |
|---|---|---|---|---|---|
| Liquid for core | Blue No. 1 | 4.69 | 4.69 | 4.69 | 4.69 |
| | JC Oil | 47.17 | 25.73 | 49.85 | 48.24 |
| | K9190 | 11.79 | 6.43 | 12.46 | 12.06 |
| | Soybean lecithin | 3.35 | 30.15 | 0 | 2.01 |
| Liquid for intermediate layer | JC Oil | 9.30 | 9.30 | 9.30 | 9.30 |
| | Soybean lecithin | 0.70 | 0.70 | 0.70 | 0.70 |
| Liquid for outermost layer | Gelatin | 17.48 | 17.48 | 17.48 | 17.48 |
| | Glycerin | 4.60 | 4.60 | 4.60 | 4.60 |
| | Pectin | 0.92 | 0.92 | 0.92 | 0.92 |
| | (Purified water) | 85.20 | 85.20 | 85.20 | 85.20 |
| Total | | 185.20 | 185.20 | 185.20 | 185.20 |

Figure 2:
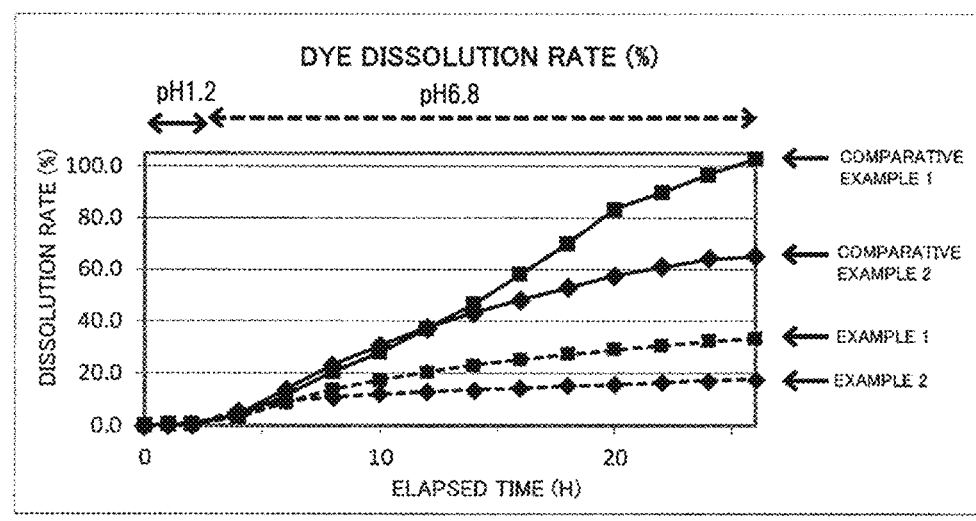
FIG. 2 is a graph showing changes in dissolution rate and time showing the results of dissolution experiments of Examples and Comparative Examples.

As is apparent from the above Examples and Comparative Examples and FIG. 2, in the Examples and the Comparative Examples, the dye starts to be dissolved from the lapse of about 4 hours from the start of the dissolution experiment, but it is understood that the dye dissolution rate of the seamless capsules of Comparative Examples becomes about twice the dye dissolution rate of the seamless capsules of the Example after 8 hours from the start of the experiment, and thereafter, the difference greatly increases. Comparative Example 1 is a seamless capsule in which soybean lecithin is not contained in a core liquid, and Comparative Example 2 shows an experiment in which the blending amount of soybean lecithin is as quantitatively small as 2.01 parts by weight. In Example 1, the blending amount of soybean lecithin is 3.35 parts by weight, and it is understood from FIG. 2 that there is a large difference as compared with Comparative Example 2. From this experimental result, it is considered that when soybean lecithin is blended in an amount exceeding 3 parts by weight, the dye dissolution rate is greatly reduced and can be controlled to some extent by the blending amount. For example, when a dissolution rate of 20% is taken as a standard, it is found that the dissolution rate reaches the value 12 hours after the start of the experiment in Example 1, but it reaches that value about 25 hours after the start of the experiment in Example 2, and it is also found that the dissolution rate can be controlled by the blending amount of soybean lecithin.

Example 3

(a) Liquid for core: 47.17 Parts by weight of JC Oil, 11.79 parts by weight of an edible fat (Witocan 42/44 manufactured by JOT Oleo GmbH; melting point: 43±3° C.), and 3.35 parts by weight of soybean lecithin were uniformly dissolved by stirring at 60° C., and into the resulting solution was mixed 4.69 parts by weight of loxoprofen sodium hydrate (CAS 80382-23-6). The resulting suspension was used as a liquid for a core.

(b) Liquid for intermediate layer: 4.65 Parts by weight of JC Oil, 4.65 parts by weight of Witocan 42/44, and 0.7 parts by weight of soybean lecithin were mixed, affording a liquid for an intermediate layer.

(c) Liquid for outermost layer: 17.48 Parts by weight of gelatin [jelly strength: 280 bloom], 4.60 parts by weight of glycerin, 0.92 parts by weight of low methoxy (LM) pectin, and 85.20 parts by weight of purified water were uniformly mixed at 60° C., affording a liquid for an outermost layer.

Into rapeseed oil, cooled to 12° C. and flowing, were simultaneously dropped the liquid for a core through an inner nozzle of a concentric triple nozzle, the liquid for an intermediate layer through an intermediate nozzle disposed outside the inner nozzle, and the liquid for an outermost layer through an outermost nozzle, whereby a triple-structure seamless capsule having a diameter of 5 mm was prepared. The resulting three-layered seamless capsule was forced-air dried at 20° C. for 8 hours.

A dissolution test was performed by a paddle method in the same manner as in Example 2, and loxoprofen sodium dissolved in the test solution was measured by high performance liquid chromatography (Shimadzu Corporation) under the following test conditions.

Detector: Ultraviolet absorptiometer (measurement wavelength: 222 nm)
Column: ODS (inner diameter: 4.6 mm, length: 15 cm)
Column temperature: 40° C.
Mobile phase: methanol/water/glacial acetic acid/triethylamine=600/400/1/1
Flow rate: 0.5 mL/min As a result of the above evaluation, it was found that the dissolution rate can be controlled.

Example 4

(a) Liquid for core: 47.17 Parts by weight of JC Oil, 11.79 parts by weight of K9190, and 3.35 parts by weight of soybean lecithin were uniformly dissolved by stirring at 60° C., and into the resulting solution was mixed 4.69 parts by weight of a lactic acid bacterium powder (a freeze dried product of Lactococcus lactis subsp. lactis JCM 7638). The resulting suspension was used as a liquid for a core.

(b) Liquid for intermediate layer: 23.25 Parts by weight of JC Oil and 1.75 parts by weight of egg yolk lecithin (manufactured by Kewpie Corporation) were mixed, affording a liquid for an intermediate layer.

(c) Liquid for outermost layer: A solution prepared by dissolving 15 parts of carrageenan (manufactured by Sansho Co., Ltd.), 50.9 parts of dextrin (manufactured by Nippon Starch Chemical Co., Ltd.; DE value: less than 10), 3 parts of sorbitol (manufactured by Mitsubishi Shoji Foodtech Co., Ltd.), 10 parts of LM pectin (manufactured by Unitec Foods Co., Ltd.), 1 part of potassium chloride, and 0.1 parts of calcium chloride in 400 parts of purified water was used as a liquid for an outermost layer.

Into rapeseed oil flowing at 20° C. were simultaneously dropped the liquid for a core through an inner nozzle of a concentric triple nozzle, the liquid for an intermediate layer through an intermediate nozzle disposed outside the inner nozzle, and the liquid for an outermost layer through an outermost nozzle, whereby a triple-structure seamless capsule having a diameter of 7 mm was prepared. The resulting three-layered seamless capsule was forced-air dried at 20° C. for 8 hours.

A dissolution test was performed by a paddle method in the same manner as in Example 2, and the number of lactic acid bacteria leaking into the test liquid was evaluated using MRS agar medium (manufactured by OXOID).

As a result of the evaluation, it was found that the dissolution rate can be controlled.

INDUSTRIAL APPLICABILITY

In the present disclosure, by blending an amphoteric surfactant in the innermost layer (core) of a seamless capsule, disintegration of the capsule can be delayed, and this is a technique for controlling disintegration of the seamless capsule and has high industrial applicability.

REFERENCE SIGNS LIST

A Nozzle section
B Seamless capsule jet
1 Inner nozzle
2 Intermediate nozzle
3 Outer nozzle
4 Capsule core solution
5 Intermediate layer solution
6 Outermost layer solution
7 Three-layered seamless capsule
8 Cooling liquid

The invention claimed is:

1. A delayed disintegration-type seamless capsule, comprising:
   a core;
   one or more intermediate layers formed on the core; and
   an outermost layer formed on the intermediate layers,
   wherein the core comprises an active substance, an amphoteric surfactant, and a fat having a melting point of 40° C. or more,
   at least one layer of the intermediate layers comprises a fat having a melting point of 45° C. or more,
   the outermost layer comprises a water-soluble natural polymer selected from the group consisting of gelatin, agar, gellan gum, carrageenan, furcellaran, pectin, chitosan, alginic acid, curdlan, starch, modified starch, pullulan, mannan, and mixtures thereof, and
   the amphoteric surfactant is lecithin, which is present in an amount of 5 to 50% by weight based on a total weight of the core and reduces an effect on the capsule's disintegration due to pH change in a body after the capsule is administered.

2. The seamless capsule according to claim 1, wherein the active substance is selected from the group consisting of a Chinese herbal medicine extract, a tincture, a plant extract, an animal extract, a microbial extract, a microbially produced extract, a fruit juice, a functional polysaccharide, a polyphenol, vitamin C, vitamin B, an amino acid, a microorganism, a bacterium, an essential oil, an anti-inflammatory drug, a steroid drug, an omega-3-fatty acid, an omega-6-fatty acid, an omega-9-fatty acid, and combinations thereof.

3. A method for producing a delayed disintegration-type seamless capsule, the method comprising:
   discharging a core liquid from an innermost nozzle of a concentric triple nozzle into a cooling liquid composed of a cooled liquid oil; and
   simultaneously dropping an intermediate layer liquid from an intermediate nozzle disposed outside the innermost nozzle and an outermost layer liquid from an outermost nozzle to form a seamless capsule,
   wherein the core liquid comprises an active substance, an amphoteric surfactant, and a fat having a melting point of 40° C. or more,
   the intermediate layer liquid comprises a fat having a melting point of 45° C. or more, and
   the outermost layer liquid comprises a water-soluble natural polymer
   selected from the group consisting of gelatin, agar, gellan gum, carrageenan, furcellaran, pectin, chitosan, alginic acid, curdlan, starch, modified starch, pullulan, mannan, and mixtures thereof,
   wherein the amphoteric surfactant is lecithin, which is present in an amount of 5 to 50% by weight based on a total weight of the core and reduces an effect on the capsule's disintegration due to pH change in a body after the capsule is administered.

4. The method for producing a seamless capsule according to claim 3, wherein the active substance is selected from the group consisting of a Chinese herbal medicine extract, a tincture, a therapeutic agent, a plant extract, an animal extract, a microbial extract, a microbially produced extract, a fruit juice, a functional polysaccharide, a polyphenol, vitamin C, vitamin B, an amino acid, a microorganism, a bacterium, an essential oil, an anti-inflammatory drug, a steroid drug, an omega-3-fatty acid, an omega-6-fatty acid, an omega-9-fatty acid, and combinations thereof.

* * * * *